United States Patent
Kim et al.

(10) Patent No.: US 9,691,088 B2
(45) Date of Patent: Jun. 27, 2017

(54) ORDERING AHEAD WITH A MOBILE DEVICE

(75) Inventors: Robert Kim, Toronto (CA); Ray Reddy, Toronto (CA)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/594,771

(22) Filed: Aug. 24, 2012

(65) Prior Publication Data
US 2014/0058901 A1    Feb. 27, 2014

(51) Int. Cl.
G06Q 30/00    (2012.01)
G06Q 30/06    (2012.01)

(52) U.S. Cl.
CPC .................................. *G06Q 30/06* (2013.01)

(58) Field of Classification Search
CPC .......................................... G06Q 30/06–30/08
USPC .................................................. 705/26–27.2
See application file for complete search history.

(56) References Cited

U.S. PATENT DOCUMENTS

| | | |
|---|---|---|
| 6,026,375 A | 2/2000 | Hall et al. |
| 6,298,125 B1 | 10/2001 | Goldberg et al. |
| 6,414,635 B1 | 7/2002 | Stewart et al. |
| 6,490,432 B1 | 12/2002 | Wegener et al. |
| 6,587,835 B1 | 7/2003 | Treyz et al. |
| 7,519,470 B2 | 4/2009 | Brasche et al. |
| 7,676,369 B2 | 3/2010 | Fujimoto et al. |
| 7,865,308 B2 | 1/2011 | Athsani et al. |
| 2001/0001145 A1 | 5/2001 | Barnett et al. |
| 2001/0014868 A1 | 8/2001 | Herz et al. |
| 2002/0095333 A1 | 7/2002 | Jokinen et al. |
| 2002/0133424 A1 | 9/2002 | Joao |
| 2003/0004802 A1 | 1/2003 | Callegari |
| 2003/0004831 A1 | 1/2003 | Owens |
| 2003/0005056 A1 | 1/2003 | Yamamoto et al. |
| 2003/0050863 A1 | 3/2003 | Radwin |

(Continued)

FOREIGN PATENT DOCUMENTS

| | | |
|---|---|---|
| JP | 11-328222 | 11/1999 |
| JP | 2001-223712 | 8/2001 |

(Continued)

OTHER PUBLICATIONS

Title: Time-Limited Coupons and Tickets for Wearable Display, with Peer-to-Peer Replication Publ: IP.Com pp. 1-5 Date: Jun. 17, 2004.

(Continued)

*Primary Examiner* — Ethan D Civan
(74) *Attorney, Agent, or Firm* — Johnson, Marcou & Isaacs, LLC

(57) ABSTRACT

The present invention provides a computer-implemented method to order ahead with a mobile device. A user network device receives an input of an order from a user; communicates the order to a merchant network device; receives a preparation time for one or more components of the order; determines a location of the user device; monitors a projected time of arrival at the merchant based on the location of the user device; compares the projected time of arrival with the component preparation time; and notifies the merchant to begin preparation of at least one of the components in response to a determination that the projected time of arrival equals the preparation time of one or more components.

24 Claims, 4 Drawing Sheets

(56) References Cited

U.S. PATENT DOCUMENTS

| | | | |
|---|---|---|---|
| 2003/0061109 A1* | 3/2003 | Banerjee et al. | 705/26 |
| 2003/0220835 A1 | 11/2003 | Barnes, Jr. | |
| 2004/0181461 A1 | 9/2004 | Raiyani et al. | |
| 2004/0210621 A1 | 10/2004 | Antonellis | |
| 2004/0215517 A1 | 10/2004 | Chen et al. | |
| 2005/0029342 A1 | 2/2005 | Sugimoto et al. | |
| 2005/0209921 A1 | 9/2005 | Roberts et al. | |
| 2007/0088624 A1 | 4/2007 | Vaughn et al. | |
| 2007/0281690 A1 | 12/2007 | Altman et al. | |
| 2008/0248815 A1 | 10/2008 | Busch | |
| 2009/0167553 A1 | 7/2009 | Hong et al. | |
| 2009/0187488 A1 | 7/2009 | Shamilian | |
| 2009/0307096 A1* | 12/2009 | Antonellis | 705/15 |
| 2010/0190513 A1 | 7/2010 | Andreasson | |
| 2011/0238476 A1 | 9/2011 | Carr et al. | |
| 2011/0238514 A1 | 9/2011 | Ramalingam et al. | |
| 2012/0016745 A1 | 1/2012 | Hendrickson | |

FOREIGN PATENT DOCUMENTS

| | | |
|---|---|---|
| JP | 2001-256398 | 9/2001 |
| JP | 2002-007826 A | 1/2002 |
| JP | 2002-304562 | 10/2002 |
| JP | 2003-006543 | 1/2003 |
| JP | 2003-091678 | 3/2003 |
| JP | 2003-115001 | 4/2003 |
| JP | 2003-203084 | 7/2003 |
| JP | 2003-296625 A | 10/2003 |
| JP | 2004-078674 | 3/2004 |
| JP | 2004-157499 | 6/2004 |
| JP | 2004-272463 | 9/2004 |
| JP | 2009-053825 A | 3/2009 |
| WO | 2014/032047 A1 | 2/2014 |

OTHER PUBLICATIONS

Author: Kolmel et al. Title: Real Life Scenarios of Location Based Advertising pp. 1-9 Date: Jan. 1, 2003.

Author: Stikeman, A. Title: Biometrics Publ: *Technology Review* vol./Iss:104(1) pp. 106-107 Date: Jan. 1, 2001.

Author: Kim, S. G. Title: International Search Report and Written Opinion issued in International Application No. PCT/US2013/056656 pp. 1-11 Date: Nov. 27, 2013.

Mohri, "International Preliminary Report on Patentability issued in International Application No. PCT/US2013/056656", mailed on Mar. 5, 2015, 8 pages.

Van Praagh, "Extended European Search Report issued in European Application No. 13831117.0", mailed on Feb. 26, 2016, 9 pages.

Zhou, et al., "Chinese Office Action issued in Chinese Application No. 201380048086.9", mailed on Feb. 3, 2017, 8 pages of English Translation and 8 pages of Chinese Office Action.

\* cited by examiner

ORDERING AHEAD WITH A MOBILE DEVICE

TECHNICAL FIELD

The present disclosure relates generally to contactless transactions, and more particularly to a method to use a mobile user device to place an order before arriving at a merchant.

BACKGROUND

Smartphones and other mobile devices are being used in new ways to streamline interactions between consumers and merchants. Methods of providing advertisements, coupons, payment transactions, and other interactions are changing quickly as mobile device technology improves.

Mobile device users have additionally used the devices to help reduce wait times at merchants. For example, a user can call ahead to a restaurant and place an order or call a pharmacy to prepare a prescription.

However, many aspects of the call-ahead process are imprecise and impractical. One problem with a traditional call-ahead process is that a merchant may be hesitant to invest inventory and labor into an order only to have the customer abandon the order and not show up. Some products produced by a merchant may be wasted if the customer does not arrive at the merchant or in some other manner pay for the order.

Another problem is that the customer must estimate a time of arrival. The merchant does not have any manner of adjusting the order based on changes in the customer arrival time. If a customer is late or misjudged an arrival time, the shelf life of the order may have expired. For example, a customer that arrives 30 minutes late for a pizza order may demand a fresher pizza, and the merchant may be forced to dispose of the first pizza.

Another problem may be that the merchant must start different components of the order at different times based on the customer's estimated arrival. Many merchants that prepare items to order may not have a system for calculating component start times.

Customers and merchants would be desirous of a system that could provide a system that allows the customer and the merchant to better coordinate orders and arrivals.

SUMMARY

The present invention provides a computer-implemented method to order ahead with a mobile device. A user network device receives an input of an order from a user; communicates the order to a merchant network device; receives a preparation time for one or more components of the order; determines a location of the user device; monitors a projected time of arrival at the merchant based on the location of the user device; compares the projected time of arrival with the component preparation time; and notifies the merchant to begin preparation of at least one of the components in response to a determination that the projected time of arrival equals the preparation time of one or more components.

Another aspect of the present invention provides a computer program product that is installed on a server located in a loyalty program system to. The computer program product includes a non-transitory computer-readable storage device having computer-readable program instructions stored therein. The computer-readable program instructions include computer program instructions for receiving an order for a product from a user network device; accessing a default preparation time for one or more components of an order from a preparation time database; receiving an indication of the status of the component preparation time, wherein the status comprises a variance from the default preparation time; determining an updated preparation time for the components of the order received from the user network device; and communicating the updated preparation time for one or more components of the order received from the user network device.

These and other aspects, objects, features and advantages of the example embodiments will become apparent to those having ordinary skill in the art upon consideration of the following detailed description of illustrated example embodiments, which include the best mode of carrying out the invention as presently presented.

DETAILED DESCRIPTION OF THE EXAMPLE EMBODIMENTS

Overview

Figure 1:
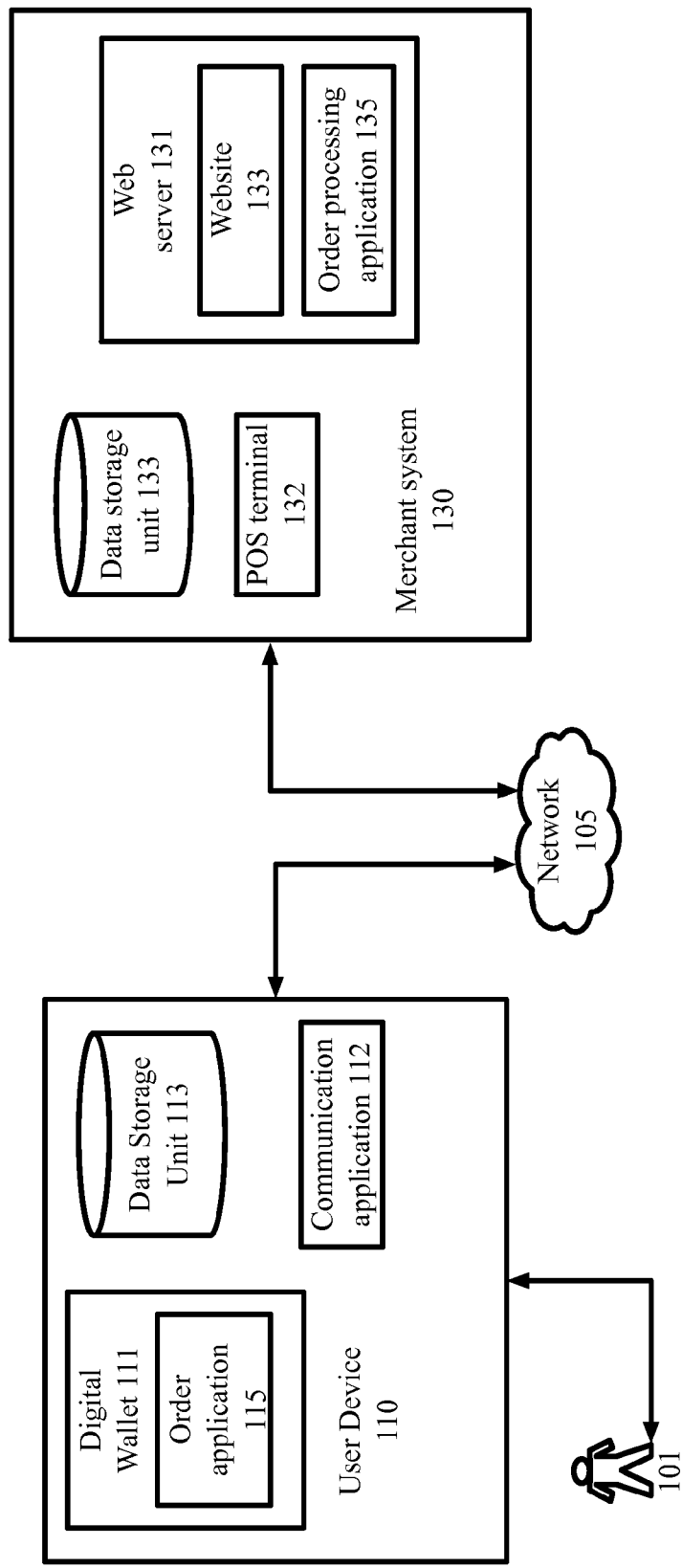
FIG. 1 is a block diagram depicting a system for ordering ahead with a mobile user device, in accordance with certain example embodiments.

The present invention provides a computer-implemented method to order ahead with a mobile user network device. A user can employ a user device to place an order with a merchant and provide updated arrival times and component start times to the merchant to reduce wait times and provide freshly prepared order components.

A user opens an order application on a user device to order from a merchant and places an order. The application may be a stand-alone application, a website or other function of a web browser accessed over the Internet, or any other suitable application configuration. The merchant may be any type of merchant that can accept orders for products from the user device. The term "product(s)" should be interpreted to include tangible and intangible products, as well as services.

Alternatively, the user may make a request of the merchant other than a request for a product. For example, the user may inform the merchant of an arrival time, such as to obtain a reservation.

An order processing application operating on the merchant server can receive the order and provide confirmation of the order to the user device. The order processing application can maintain a database of component preparation times. For example, at a restaurant, the database can store the preparation times of each food item that may be a component of a meal order.

In an alternate embodiment, the database may be maintained on the order application on the user device, a third party server, or other location. The database may be updated periodically by the merchant server.

The order processing application can analyze the order to ensure that all necessary inventory and required labor are available to meet the preparation times for each component. If a necessary item is not available, the order processing application can refuse the order or offer an alternative product.

The merchant can further determine if the order can be produced in the default preparation times for the order components. For example, if the kitchen in a restaurant is busy and orders are being delayed, then the merchant can input a delay in the preparation times of the order or the order components. The delay may be entered into the order processing application manually by a merchant or merchant server operator.

Additionally or alternatively, the order processing application can monitor the order processing operation and determine when a delay is warranted. The length of the delay can be determined and added to the component preparation times.

After the order is placed, the order application on the user device can receive the preparation times for each component of the order and store the preparation times on the user device. The component preparation times sent by the order processing application can be the default preparation times or can include any delays.

The user device determines the location of the user and the projected route to the merchant. The user device can employ the global positioning system ("GPS") technology of the device and the application can use a mapping system to determine the projected route and an estimated time of arrival at the merchant. Any other suitable location determining system may be employed by the user device to determine the location of the user. The order application can execute a mapping function or the order application can employ any other mapping application or website for the purposes of determining the route and estimated time of arrival.

Additionally, the order application can conduct the payment transaction. The order application may employ a digital wallet or other payment application on the user device to conduct the transaction with the merchant. The transaction may be conducted with the merchant server or other suitable server. Alternatively, the user may manually enter the payment information into the application, a website, or other payment mechanism. Alternatively, the user may charge the purchase to a configured account with the merchant or in any other way conduct the transaction.

The order application can compare the projected route to the merchant with the preparation times of the order components. The order application can determine the times at which the preparation of the order components should be initiated. For example, if one component of the order requires 10 minutes to prepare, the order application can monitor the route and location of the user and provide an alert when the user is 10 minutes from the merchant. If another component requires 3 minutes to prepare, a second alert can be sent when the user is 3 minutes from the merchant. The alert can be transmitted to the order processing application of the merchant or other application operating on the server that can initiate the preparation of the component. The process will repeat for each component of the order.

The user device can further alert the merchant of the arrival of the user at the merchant location. The merchant at this time can supply the order to the user with a minimal delay.

Example System Architectures

Turning now to the drawings, in which like numerals represent like (but not necessarily identical) elements throughout the figures, example embodiments of the present invention are described in detail.

FIG. 1 is a block diagram depicting a system for ordering ahead with a mobile user device, in accordance with certain example embodiments. As depicted in FIG. 1, the system 100 includes network devices 110 and 130 that are configured to communicate with one another via one or more networks 105.

Each network 105 includes a wired or wireless telecommunication means by which network devices (including devices 110 and 130) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110 and 130 includes a device having a communication module capable of transmitting and receiving data over the network 105. For example, each network device 110 and 130 can include a server, desktop computer, laptop computer, tablet computer, smart phone, handheld computer, personal digital assistant ("PDA"), or any other wired or wireless, processor-driven device. In the example embodiment depicted in FIG. 1, the network devices 110 and 130 are operated by end-users or consumers and merchant operators.

The user 101 can use the communication application 112, such as a web browser application or a stand-alone application, to view, download, upload, or otherwise access documents or web pages via a distributed network 105. The network 105 includes a wired or wireless telecommunication system or device by which network devices (including devices 110 and 130) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer based environment.

The communication application 112 can interact with web servers or other computing devices connected to the network 105, including web server 131 and the point of sale terminal 132 of the merchant system 130. Additionally, the user device 110 and the POS terminal 132, web server 131, or other computer can establish a communication via near field communication ("NFC"), BLUETOOTH, Wi-Fi, infrared, or any other suitable communication technology.

The user network device 110 may include a digital wallet application 111. The digital wallet 111 may encompass any application, hardware, software, or process the user device 110 may employ to assist the user 101 in completing a purchase. The digital wallet 111 can interact with the communication application 112 or can be embodied as a companion application of the communication application 112. As a companion application, the digital wallet 111 executes within the communication application 112. That is, the digital wallet 111 may be an application program embedded in the communication application 112.

The user device 110 can include an order application 115. The order application 115 can interact with the communication application 112 or be embodied as a companion application of the communication application 112 and execute within the communication application 112. The order application 115 may further be embodied as a companion application of the digital wallet 111 and execute within the digital wallet 111. The order application 115 may employ a software interface for configuration that may open in the digital wallet application 111 or may open in the communication application 112.

The order application 115 is operable to allow a user 101 to configure an account, download ordering information, such as a menu, and interact with a merchant system 130 to order one or more products. The order application 115 is further operable to store order information in a data storage unit 113 stored on or coupled to the user device 110.

The user device 110 also includes a data storage unit 113 accessible by the digital wallet 111, the order application 115, and the communication application 112. The example data storage unit 113 can include one or more tangible computer-readable storage devices. The data storage unit 113 can be stored on the user device 110 or can be logically coupled to the user device 110. For example, the data storage unit 113 can include on-board flash memory and/or one or more removable memory cards or removable flash memory.

Alternatively, the functions of one or more of the components of the user device 110 can be performed in a cloud computing system (not pictured). For example, the data storage unit 113 can be embodied by a storage device on a remote server operating as a cloud computing environment for the user device 110. In another example, some or all of the functions of the order application 115 can be performed in a cloud computing environment. For example, the calculations required to determine a the arrival of a user 101 at a merchant system location 130 can be performed by a remote server operating as a cloud computing environment.

The merchant system 130 represents an entity that offers products for the user 101 to purchase or use. The merchant system 130 includes a point of sale ("POS") terminal 132. The POS terminal 132 may be operated by a salesperson that enters the purchase data into the POS terminal 132 to complete the purchase transaction. The merchant system 130 can include a web server 131 to host a website 133 and the order processing application 135. The web server 131 may be embodied as a server operating at the merchant system location or in a remote location. The web server 131 may be the system employed by the merchant system 130 to operate the production, sales, operations, or other functions of the merchant system 130.

The order processing application 135 is a system to receive orders, monitor merchant resources, supply component preparation times, conduct payment transactions, and other suitable functions. The order processing application 135 may be a function of the merchant system 130 and the web server 131. The order processing application 135 may be an independent system that the merchant system 130 employs. The order processing application 135 may be a third party application, or any other system that may manage the product orders.

The merchant system 130 can contain a data storage unit 133 that can include one or more tangible computer-readable storage devices. The data storage unit 133 can be stored on the web server 131 or can be logically coupled to the web server 131. For example, the data storage unit 133 can include on-board flash memory and/or one or more removable memory cards or removable flash memory.

It will be appreciated that the network connections shown are example and other means of establishing a communications link between the computers and devices can be used. Moreover, those having ordinary skill in the art having the benefit of the present disclosure will appreciate that the merchant system 130 and the user device 110 illustrated in FIG. 1 can have any of several other suitable computer system configurations. For example, a user device 110 embodied as a mobile phone or handheld computer may not include all the components described above.

Example Processes

The components of the example operating environment 100 are described hereinafter with reference to the example methods illustrated in FIGS. 2 and 3. The example embodiments can include one or more computer programs that embody the functions described herein and illustrated in the appended flow charts. However, it should be apparent that there could be many different ways of implementing aspects of the example embodiments in computer programming, and these aspects should not be construed as limited to one set of computer instructions. Further, a skilled programmer would be able to write such computer programs to implement example embodiments based on the flow charts and associated description in the application text. Therefore, disclosure of a particular set of program code instructions is not considered necessary for an adequate understanding of how to make and use the example embodiments. Further, those skilled in the art will appreciate that one or more acts described may be performed by hardware, software, or a combination thereof, as may be embodied in one or more computing systems.

Figure 2:
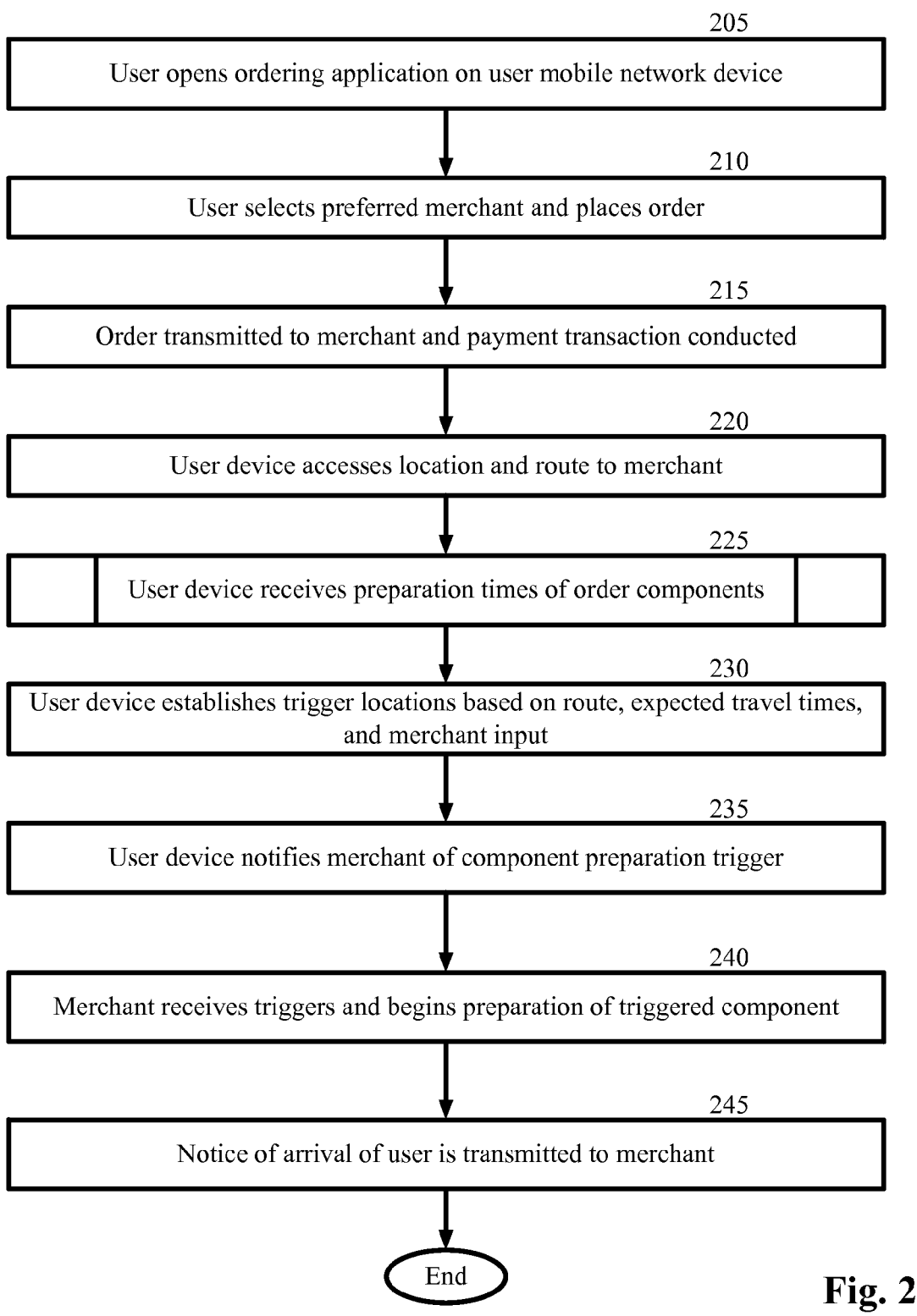
FIG. 2 is a block flow diagram depicting a method to order ahead with a mobile user device, in accordance with certain example embodiments.

FIG. 2 is a block flow diagram depicting a method 200 to order ahead on a user network device, in accordance with certain example embodiments.

With reference to FIGS. 1 and 2, in block 205, a user 101 with a mobile user network device 110 opens an order application 115 to place an order for a product with a merchant system 130. The order application 115 may be a stand-alone application, a website or other function of a web browser accessed over the Internet, or any other suitable application configuration. The term "product(s)" should be interpreted to include tangible and intangible products, as well as services. The merchant system 130 may be any type of merchant that can accept orders for products from the user device 110. The order application 115 may recommend merchant systems 130 to the user 101 based on the location of the user 101, the time or date of the order, the situation of the user 101, or other suitable criteria. The order application 115 may further provide a list of merchant systems 130 with whom the user 101 has previously had a transaction. Alternatively, the order application 115 may be configured to provide an ordering system for a specific merchant system 130. That is, the application 115 may be provided by, or specifically for, one merchant system 130 or a group of related merchants.

In block 210, the user 101 selects a merchant system 130 and places an order. The order application 115 may provide a user interface listing order options, such as a menu or other price list. Additionally or alternatively, the order application 115 may receive a text description or list of items the user 101 desires to order. Any other suitable manner of receiving an input of an order from a user 101 can be utilized.

Alternatively, the user 101 may make a request of the merchant system 130 other than a request for a product. For example, the user 101 may inform the merchant system 130 of an arrival time, such as to obtain a reservation.

In block 215, the order is transferred to the merchant system 130. The order can be received by the order processing application 135. The order can be transmitted to the order processing application 135 from the order application 115 via an Internet connection over the network 105, email, text, or any other suitable technology.

Additionally, the order application 113 can conduct the payment transaction with the merchant system 130. The order application 113 may employ a digital wallet 111 or other payment application on the user device 110 to conduct the transaction with the merchant system 130. The transaction may be conducted with the merchant server 131 or other suitable server. Alternatively, the user 101 may manually enter the payment information into the application or a website or other payment mechanism. Alternatively, the user 101 may charge the purchase to a configured account with the merchant system 130 or in any other way conduct the transaction.

In block 220, the order application 115 determines the location of the user 101 and the projected route to the merchant system 130. The user device 110 can employ the global positioning system ("GPS") technology of the user device 110 and the application 115 can use a mapping system to determine the projected route and an estimated time of arrival at the merchant system 130. Any other location determining system may be employed by the user device 110 to determine the location of the user 101. The order application 115 can execute a mapping function or the order application 115 can employ any other mapping application or website for the purposes of determining the route and estimated time of arrival.

In block 225, the order processing application 135 can transmit the preparation times of the order components to the order application 115. The details of this block are explained in greater detail below with respect to FIG. 3.

In block 230, the order application 115 can compare the location of the user 101 and the projected route to the location of the merchant system 130 with the preparation times of the order components. The order application 113 can determine the times at which the preparation of the order components should be initiated. For example, if one component of the order requires 10 minutes to prepare, the order application 115 can monitor the route and location of the user 101 and set an alert to be triggered when the user is 10 minutes from the location of the merchant system 130. The process will repeat for each component of the order. For example, if a second component of the order requires 4 minutes to prepare, the order application 115 can set an alert when the user is 4 minutes from the location of the merchant system 130.

The alert can be transmitted to the order processing application 135 of the merchant system 130 or other application operating on the server 131 that can initiate the preparation of the component.

In block 235, the location, route, and expected time of arrival can be monitored periodically or continually by the order application 115 and the user device 110. As the triggers for the expected arrival of the user 101 are encountered, the alert can be transmitted to the order processing application 135 of the merchant system 130 or other application operating on the server 131 that can initiate the preparation of the component.

If delays are encountered while traveling to the location of the merchant system 130, the order application 115 can update the alert triggers accordingly. For example, if the projected time of arrival is delayed by 5 minutes, the alert trigger to start the second component can be delayed for 5 minutes as well.

If a delay is received from the order processing application 135, the order application 115 can adjust the alert triggers accordingly. For example, if the order processing application 135 has transmitted an alert that the merchant system 130 is experiencing a delay of 5 minutes per order component, then the order application 115 can add five minutes to the alert triggers of each component of the order.

In block 240, the order processing application 135 of the merchant system 130 receives the alert from the order application 115. The merchant system 130 can begin preparation of the triggered components.

In block 245, the order application 115 can notify the order processing application 135 of the arrival of the user 101 at the location of the merchant system 130. For example, the order application 115 can determine that the user 101 is arriving in the parking lot of the merchant system 130 or is within a threshold distance from the location of the merchant system 130. Upon receipt of the alert, the merchant system 130 can complete any required preparations for the user 101. For example, the merchant system 130 can package the order to be delivered to the user 101 upon entrance to the facility of the merchant system 130. In another example, the merchant system 130 can deliver the order to the user 101 in the parking lot or in a designated waiting area of the merchant facility.

From block 245, the method 200 ends.

Figure 3:
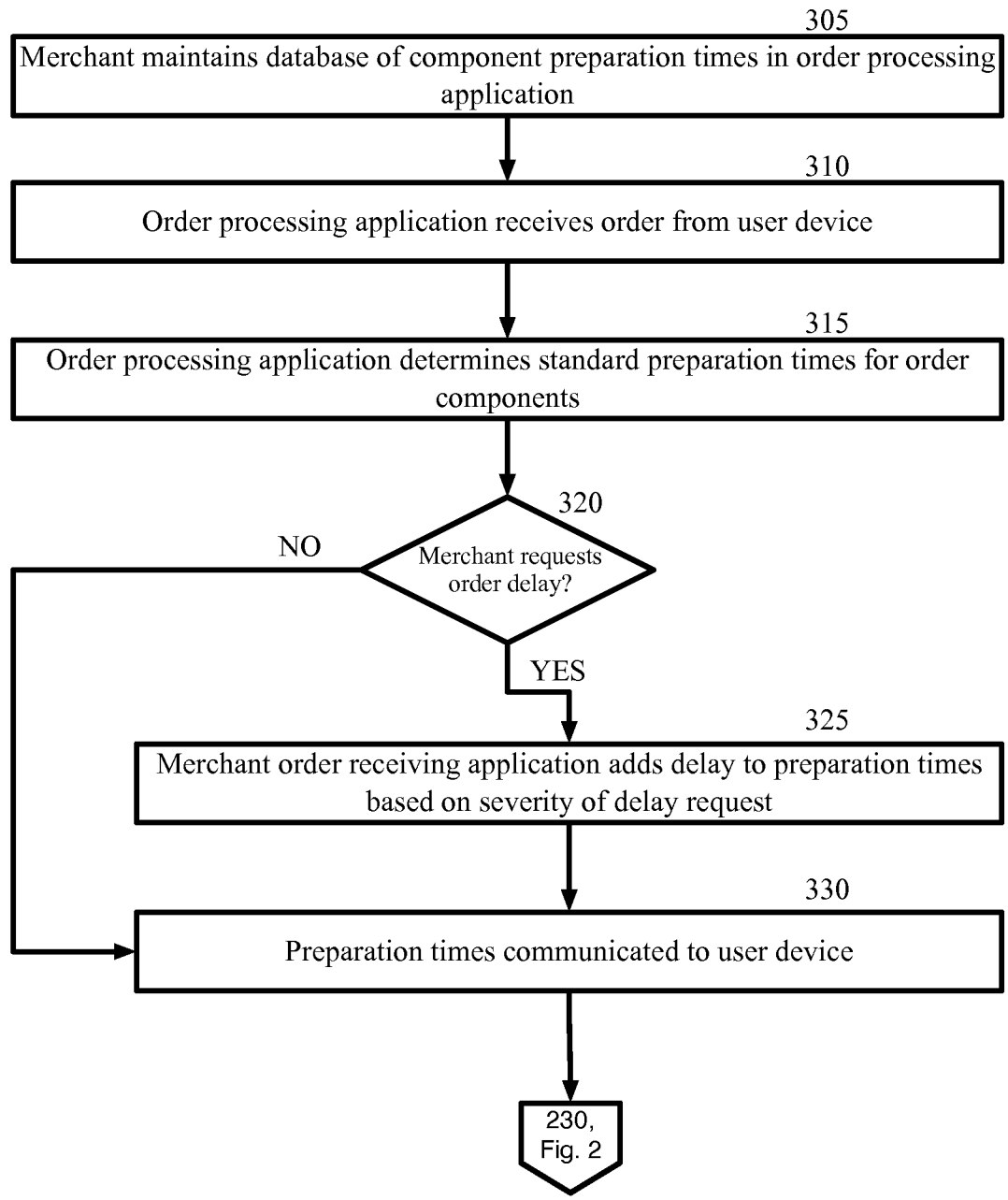
FIG. 3 is a block flow diagram depicting a method to provide order component preparation times to a user device, in accordance with certain example embodiments.
Figure 4:
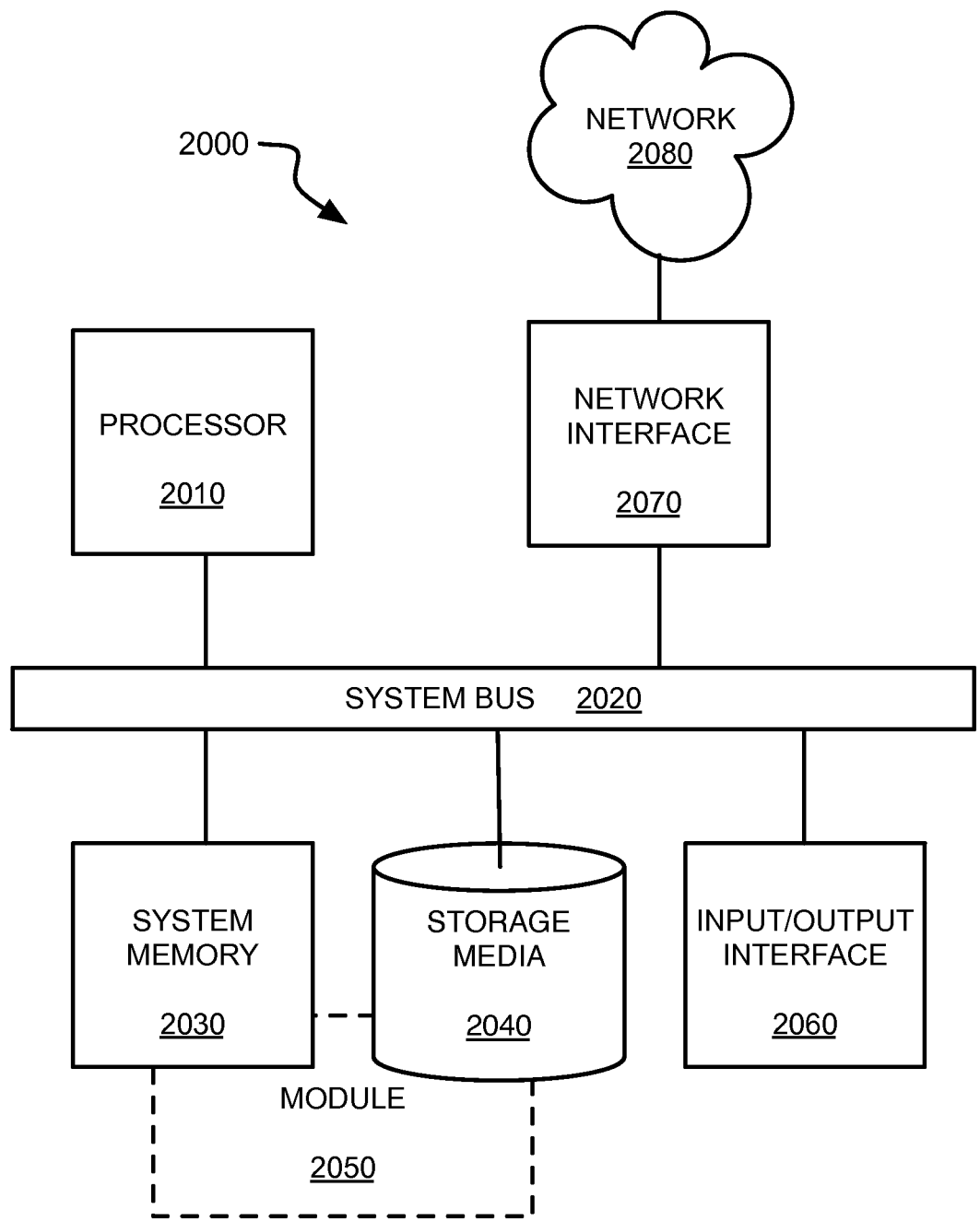
FIG. 4 is a block diagram depicting a computing machine and a module, in accordance with certain example embodiments.

FIG. 3 is a block flow diagram depicting a method 225 to provide order component preparation times to a user device 110, in accordance with certain example embodiments.

With reference to FIGS. 1 and 2, in block 305 the order processing application 135 of the merchant system 130 maintains a database of component preparation times. For example, at a restaurant, the database can store the preparation times of each food item that may be a component of a meal order. In another example, a pharmacy can store the preparation times for each medicine or other product that may be a component of a pharmacy order.

In an alternate embodiment, the database may be maintained on the order application 115 on the user device 110, on a third party server, or in other location. The database may be updated periodically by the merchant server 131.

In block 310, the order processing application 135 operating on the merchant server 131 can receive the order and provide confirmation of the order to the user device 110. The order processing application 135 can isolate the components of the order. The order processing application 135 additionally can conduct the payment transaction with the user device 110.

In block 315, the order processing application 135 can compare the order to the database to determine the standard preparation times for each component of the order. The order processing application 135 additionally can analyze the order to ensure that all necessary inventory and required labor are available to meet the preparation times for each component. If a necessary item is not available, the order processing application 135 can refuse the order or offer an alternative product.

In block 320, the order processing application 135 determines if the merchant system order preparation operation can produce the components of the order in the standard preparation times stored in the database. A merchant system operator, such as a kitchen manager, pharmacist, sales clerk, or other person responsible for fulfilling an order, can alert the order processing application 135 that the order preparation operation is delayed. For example, if the kitchen in a restaurant is busy and orders are being delayed, then the operator can input a delay in the preparation times of the order or the order components. The delay may be entered into the order processing application 135 manually by the operator.

Additionally or alternatively, the order processing application 135 can monitor the order processing operation and determine when a delay is warranted. The length of the delay can be determined and added to the component preparation times. For example, the order processing application 135 can recognize that the list of unfilled orders is longer than a threshold and a delay in order fulfillment is imminent. The order processing application 135 may further determine the length of the projected delay.

The order processing application 135 may additionally or alternatively provide the operator with a default delay mechanism or "delay button". The delay button is provided to allow the operator to initiate a delay of a configured period of time in a quick and efficient manner without the need to enter the order processing application 135 on a computer or the merchant server 131. The delay button may be embodied as a simple button that an operator may actuate to request a delay for all pending and future orders. The button may be physical, virtual, or any other suitable representation of a delay button. The button may be actuated by depressing the button, actuating a virtual button, voice command, or any other suitable manner of actuating a delay.

If a delay has been entered or the delay button has been actuated, the method 225 follows the "YES" branch of block 320 to block 325. If no delay has been entered and the delay button has not been actuated, the method 225 follows the "NO" branch of block 320 to block 330.

Following the "YES" block 320 of method 225 to block 325, the order processing application 135 can add the configured delay to the component preparation times. The amount of time added to the preparation times may be a standard delay initiated by the delay button, may be based on the delay entered into the order processing application 135 by an operator, may be calculated by the order processing application 135 based on the condition of the order preparation system, or may be determined by any other suitable mechanism.

In block 325, the order processing application 135 can transmit the component order preparation times to the order application 115 on the user device. The component order preparation times may include any delays added by the order processing application 135.

From block 325, method 225 ends.

Other Example Embodiments

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed. Instructions also may be provided to users to notify them regarding policies about the use of information, including personally identifiable information, and manners in which each user may affect such use of information. Thus, information can be used to benefit a user, if desired, through receipt of relevant advertisements, offers, or other information, without risking disclosure of personal information or the user's identity.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of the invention. Accordingly, such alternative embodiments are included in the inventions described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks and components corresponding to, the disclosed aspects of the example embodiments, in addition to those described above, can be made by those having ordinary skill in the art without departing from the spirit and scope of the invention defined in the following claims, the scope of which is to be accorded the broadest interpretation so as to encompass such modifications and equivalent structures.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

What is claimed is:

1. A computer-implemented method to reduce merchant system monitoring of user locations by maintaining preparation times of order components on mobile devices for communication to merchants, comprising:
    displaying, by a graphical user interface of an application executing on a user network device associated with a user, a list of merchants with whom the user has previously placed orders;
    in response to a selection of a merchant, displaying, by the graphical user interface of the application executing on the user network device associated with the user, a menu associated with the merchant from which subsequent orders may be selected;
    receiving, by the application executing on the user network device associated with the user, an input of an order from the user, the order comprising at least one component and being associated with a merchant that will fill the order, and the order being based on the displayed menu;
    communicating, by the application executing on the user network device, the order to a merchant network device associated with the merchant, the merchant network device being separate and distinct from the user network device;
    receiving, by the application executing on the user network device and from the merchant network device associated with the merchant, a preparation time for each component of the order and a location of the merchant;
    determining, by the application executing on the user network device, a location of the user network device and from a location determining computing system operating on the user network device;
    repeatedly calculating, by the application executing on the user network device, a projected time of travel from the location of the user network device to the location of the merchant based on the determined location of the user device and the location of the merchant;
    determining, by the application executing on the user network device, whether the projected time of travel equals the component preparation time for any component of the order; and
    notifying, by the application executing on the user network device, the merchant network device to begin preparation of a particular component of the order in response to a determination that the projected time of travel equals the preparation time for the particular component of the order.

2. The computer-implemented method of claim 1, further comprising:
    determining, by the application executing on the user network device, that the location of the user network device is within a predetermined range of the location of the merchant; and
    notifying, by the application executing on the user network device, the merchant network device of the location of the user device in response to determining that the location of the user network device is within the predetermined range of the location of the merchant.

3. The computer-implemented method of claim 1, wherein the step of receiving a preparation time for each component of the order is performed after communicating the order to the merchant network device.

4. The computer-implemented method of claim 1, wherein the step of receiving a preparation time for each component of the order is performed before communicating the order to the merchant network device.

5. The computer-implemented method of claim 1, further comprising:
    receiving, by the application executing on the user network device, an indication of a delay time for preparation of orders by the merchant; and
    increasing, by the application executing on the user network device, the component preparation time for each component of the order by an amount of the delay time.

6. The computer-implemented method of claim 1, wherein the preparation time for each component of the order includes a wait time for preparation of orders by the merchant.

7. The computer-implemented method of claim 1, wherein the merchant is a restaurant or a pharmacy.

8. The computer-implemented method of claim 1, further comprising receiving, by the application executing on the user network device, an updated preparation time for the particular component of the order prior to notifying the merchant network device to begin preparation of the particular component of the order,
    wherein the step of determining whether the projected time of travel equals the component preparation time for any component of the order is based on the updated preparation time for the particular component of the order.

9. A system to order ahead with a mobile device, comprising:
    a memory; and
    a processor communicatively coupled to the memory, wherein the processor executes application code instructions that are stored in the memory to cause the system to:
        receive an input of an order from a user network device associated with a user, the order comprising at least one component and being associated with a merchant that will fill the order;

communicate the order to a merchant network device associated with the merchant, the merchant network device being separate and distinct than the user network device;
receive a preparation time for each component of the order;
determine a location of the user network device;
monitor a projected time of travel from the location of the user network device to the location of the merchant based on the location of the user device and a location of the merchant;
determine whether the projected time of travel equals the component preparation time for any component of the order; and
notify the merchant network device to begin preparation of a particular component of the order in response to a determination that the projected time of travel equals the preparation time for the particular component of the order.

10. The system of claim 9, the instructions further causing the system to:
determine that the location of the user network device is within a predetermined range of the location of the merchant;
notify the merchant network device of the location of the user device in response to determining that the location of the user network device is within the predetermined range of the location of the merchant.

11. The system of claim 9, wherein the step of receiving a preparation time for each component of the order is performed after communicating the order to the merchant network device.

12. The system of claim 9, wherein the step of receiving a preparation time for each component of the order is performed before communicating the order to the merchant network device.

13. The system of claim 9, the instructions further causing the system to:
receive an indication of a delay time for preparation of orders by the merchant; and
increase the component preparation time for each component of the order by an amount of the delay time.

14. The system of claim 9, wherein the preparation time for each component of the order includes a wait time for preparation of orders by the merchant.

15. The system of claim 9, wherein the merchant is a restaurant or a pharmacy.

16. The system of claim 9, the instructions further causing the system to receive an updated preparation time for the particular component of the order prior to notifying the merchant network device to begin preparation of the particular component of the order,
wherein the step of determining whether the projected time of travel equals the component preparation time for any component of the order is based on the updated preparation time for the particular component of the order.

17. A computer program product, comprising:
a non-transitory computer-readable storage device having computer-executable program instructions embodied thereon that when executed by a computer cause the computer to order ahead, the computer-executable program instructions comprising:
computer-executable program instructions to receive an input of an order from a user network device associated with a user, the order comprising at least one component and being associated with a merchant that will fill the order;
computer-executable program instructions to communicate the order to a merchant network device associated with the merchant, the merchant network device being separate and distinct than the user network device;
computer-executable program instructions to receive a preparation time for each component of the order;
computer-executable program instructions to determine a location of the user network device;
computer-executable program instructions to monitor a projected time of travel from the location of the user network device to the location of the merchant based on the location of the user device and a location of the merchant;
computer-executable program instructions to determine whether the projected time of travel equals the component preparation time for any component of the order; and
computer-executable program instructions to notify the merchant network device to begin preparation of a particular component of the order in response to a determination that the projected time of travel equals the preparation time for the particular component of the order.

18. The computer program product of claim 17, further comprising:
computer-executable program instructions to determine that the location of the computer-readable storage device is within a predetermined range of the location of the merchant; and
computer-executable program instructions to notify the merchant network device of the location of the user device in response to determining that the location of the computer-readable storage device is within the predetermined range of the location of the merchant.

19. The computer program product of claim 17, wherein the step of receiving a preparation time for each component of the order is performed after communicating the order to the merchant network device.

20. The computer program product of claim 17, wherein the step of receiving a preparation time for each component of the order is performed before communicating the order to the merchant network device.

21. The computer program product of claim 17, further comprising:
computer-executable program instructions to receive an indication of a delay time for preparation of orders by the merchant; and
computer-executable program instructions to increase the component preparation time for each component of the order by an amount of the delay time.

22. The computer program product of claim 17, wherein the preparation time for each component of the order includes a wait time for preparation of orders by the merchant.

23. The computer program product of claim 17, wherein the merchant is a restaurant or a pharmacy.

24. The computer program product of claim 17, further comprising computer-executable program instructions to receive an updated preparation time for the particular component of the order prior to notifying the merchant network device to begin preparation of the particular component of the order, wherein the step of determining whether the projected time of travel equals the component preparation time for any component of the order is based on the updated preparation time for the particular component of the order.

* * * * *